(12) United States Patent
Okada et al.

(10) Patent No.: US 8,810,953 B2
(45) Date of Patent: Aug. 19, 2014

(54) ERROR RECOVERY BASED ON APPLYING CURRENT/VOLTAGE TO A HEATING ELEMENT OF A MAGNETIC HEAD

(75) Inventors: Yukimasa Okada, Odawara (JP); Katsumi Hoshino, Odawara (JP); Koji Kataoka, Odawara (JP); Takashi Wagatsuma, Odawara (JP)

(73) Assignee: HGST Netherlands B.V., Amsterdam (NL)

( * ) Notice: Subject to any disclaimer, the term of this patent is extended or adjusted under 35 U.S.C. 154(b) by 209 days.

(21) Appl. No.: 13/310,502

(22) Filed: Dec. 2, 2011

(65) Prior Publication Data
US 2013/0141814 A1    Jun. 6, 2013

(51) Int. Cl.
    *G11B 21/02*    (2006.01)
(52) U.S. Cl.
    USPC .......................................................... 360/75
(58) Field of Classification Search
    USPC .............................................. 360/55, 59, 75
    See application file for complete search history.

(56) References Cited

U.S. PATENT DOCUMENTS

| | | | |
|---|---|---|---|
| 5,808,825 A | 9/1998 | Okamura | |
| 6,441,982 B1 | 8/2002 | Fukushima et al. | |
| 6,760,174 B2 | 7/2004 | Forehand | |
| 6,975,474 B2 | 12/2005 | Naka | |
| 7,023,645 B1 | 4/2006 | Emo et al. | |
| 7,042,674 B1 | 5/2006 | Baril et al. | |
| 7,342,736 B1 * | 3/2008 | Turner et al. | 360/75 |
| 7,352,525 B1 | 4/2008 | Shrestha et al. | |
| 7,385,778 B2 | 6/2008 | Kakiki | |
| 7,525,752 B2 | 4/2009 | Satoh et al. | |
| 7,808,741 B2 | 10/2010 | Matsumoto et al. | |
| 2006/0268464 A1 | 11/2006 | Yang | |
| 2008/0019032 A1 * | 1/2008 | Hayakawa et al. | 360/75 |
| 2008/0225430 A1 * | 9/2008 | Kawamoto et al. | 360/75 |
| 2009/0141391 A1 * | 6/2009 | Kuramoto et al. | 360/75 |
| 2009/0168248 A1 * | 7/2009 | Matsumoto et al. | 360/235.7 |
| 2009/0296270 A1 | 12/2009 | Jin et al. | |
| 2013/0170070 A1 * | 7/2013 | Das et al. | 360/75 |

FOREIGN PATENT DOCUMENTS

| | | |
|---|---|---|
| JP | 11/328603 | 11/1999 |
| JP | 2001/093104 | 4/2001 |
| JP | 2002/150510 | 5/2002 |

\* cited by examiner

*Primary Examiner* — Tan X Dinh
(74) *Attorney, Agent, or Firm* — Zilka-Kotab, PC

(57) ABSTRACT

In one embodiment, a magnetic disk device includes a magnetic disk medium, at least one magnetic head having at least one of: a magnetic read element adapted for reading data from the magnetic disk medium and a magnetic write element adapted for writing data to the magnetic disk medium, and a heating element adapted for generating heat upon application of a voltage/current thereto, wherein the heating element is positioned on, near, or within the magnetic head, a drive mechanism for passing the magnetic disk medium over the at least one magnetic head, and a controller electrically coupled to the at least one magnetic head for controlling operation of the at least one magnetic head, wherein the controller is configured to retract the at least one magnetic head from a flying state above the magnetic disk medium and apply the voltage/current to the heating element while the magnetic head is retracted.

20 Claims, 9 Drawing Sheets

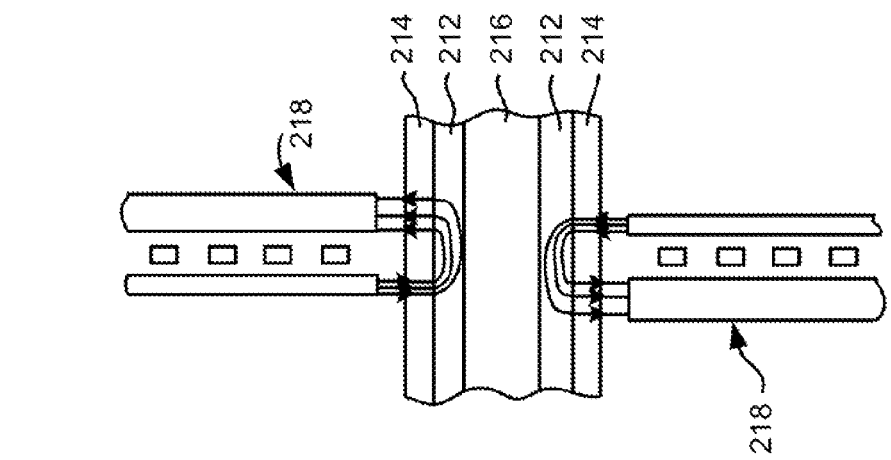
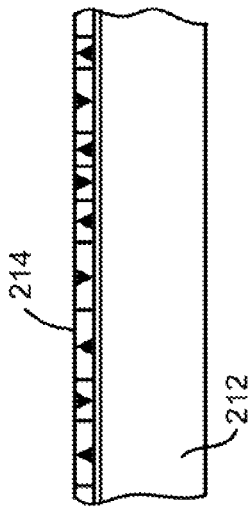
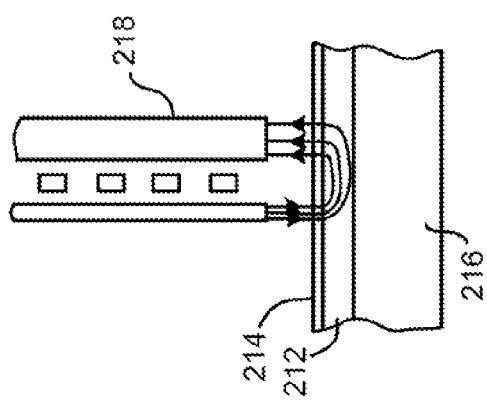
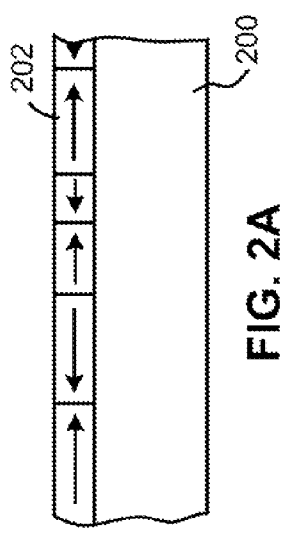
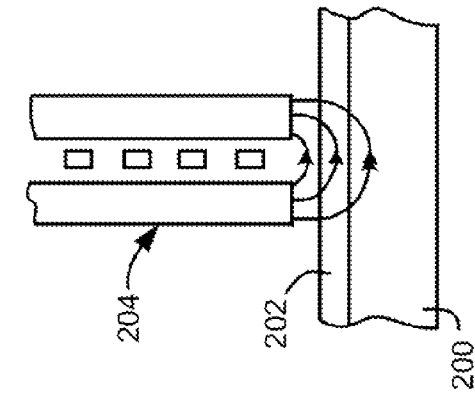

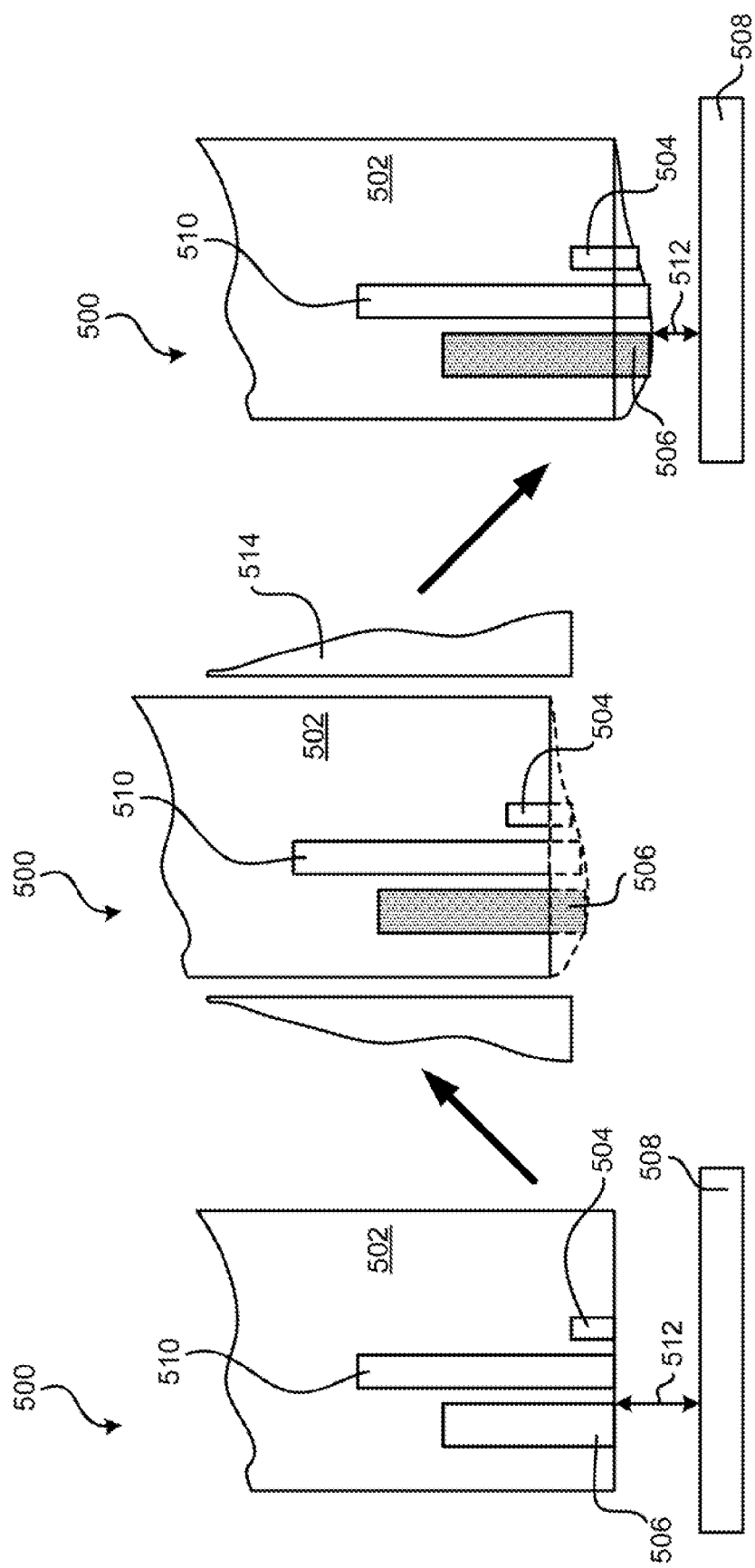

ERROR RECOVERY BASED ON APPLYING CURRENT/VOLTAGE TO A HEATING ELEMENT OF A MAGNETIC HEAD

FIELD OF THE INVENTION

The present application relates to error recovery based on applying current/voltage to a heating element of a magnetic head, and particularly to applying current/voltage a thermal fly-height control (TFC) element of the magnetic head when it is unloaded from a hard disk drive for error recovery.

BACKGROUND

If read-out errors occur due to magnetic instability of a magnetic read head when a recording signal is read out in a magnetic disk device, such as a hard disk drive (HDD), an error recovery process is performed to return the magnetically unstable read head to a stable state by repeatedly performing off-track processing and dummy writing and varying the read-out current/voltage to impart thermal and magnetic stress to the read head, as shown in FIG. 6.

However, a problem occurs in that as magnetic read heads have transitioned from being primarily anisotropic magnetoresistive (AMR) and giant magnetoresistive (GMR) heads to being primarily tunneling magnetoresistive (TMR) heads, the resistance of the magnetic read head increases by at least one order of magnitude, which causes Joule heat generated by the application of a read-out voltage of the same magnitude to decrease by at least one order of magnitude, and consequently there is insufficient thermal stress to return the magnetically unstable read head to a stable state. This can be visualized as Read Head Heat Generation Amount $\infty$ (Applied Voltage)$^2$/(Read Head Resistance).

SUMMARY

In one embodiment, a magnetic disk device includes a magnetic disk medium, at least one magnetic head having at least one of: a magnetic read element adapted for reading data from the magnetic disk medium and a magnetic write element adapted for writing data to the magnetic disk medium, and a heating element adapted for generating heat upon application of a voltage/current thereto, wherein the heating element is positioned on, near, or within the magnetic head, a drive mechanism for passing the magnetic disk medium over the at least one magnetic head, and a controller electrically coupled to the at least one magnetic head for controlling operation of the at least one magnetic head, wherein the controller is configured to retract the at least one magnetic head from a flying state above the magnetic disk medium and apply the voltage/current to the heating element while the magnetic head is retracted.

In another embodiment, a method includes reading data from a magnetic disk medium using a magnetic read element of a magnetic head while the magnetic head is in a flying state, detecting a magnetically unstable state of the magnetic head during the reading, retracting the magnetic head from the magnetic disk medium, and applying a voltage/current to an element of the magnetic head while the magnetic head is retracted to return the magnetic head to a magnetically stable state.

In yet another embodiment, a magnetic disk device includes a magnetic disk medium, at least one magnetic head having at least one element therein, a drive mechanism for passing the magnetic disk medium over the at least one magnetic head, and a controller electrically coupled to the at least one magnetic head for controlling operation of the at least one magnetic head, wherein the controller is configured to retract the at least one magnetic head from a flying state above the magnetic disk medium and apply a voltage/current to the at least one element while the magnetic head is retracted.

Any of these embodiments may be implemented in a magnetic data storage system such as a disk drive system, which may include a magnetic head, a drive mechanism for passing a magnetic storage medium (e.g., hard disk) over the head, and a control unit electrically coupled to the head for controlling operation of the head.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

FIG. 5 shows partial views of a magnetic head, according to one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a magnetic disk device includes a magnetic disk medium, at least one magnetic head having at least one of a magnetic read element adapted for reading data from the magnetic disk medium and a magnetic write element adapted for writing data to the magnetic disk medium, and a heating element adapted for generating heat upon application of a voltage/current thereto, wherein the heating element is positioned on, near, or within the magnetic head, a drive mechanism for passing the magnetic disk medium over the at least one magnetic head, and a controller electrically coupled to the at least one magnetic head for controlling operation of the at least one magnetic head, wherein the controller is configured to retract the at least one magnetic head from a flying state above the magnetic disk medium and apply the voltage/current to the heating element while the magnetic head is retracted.

In another general embodiment, a method includes reading data from a magnetic disk medium using a magnetic read element of a magnetic head while the magnetic head is in a flying state, detecting a magnetically unstable state of the magnetic head during the reading, retracting the magnetic head from the magnetic disk medium, and applying a voltage/current to an element of the magnetic head while the magnetic head is retracted to return the magnetic head to a magnetically stable state.

In yet another general embodiment, a magnetic disk device includes a magnetic disk medium, at least one magnetic head having at least one element therein, a drive mechanism for passing the magnetic disk medium over the at least one magnetic head, and a controller electrically coupled to the at least one magnetic head for controlling operation of the at least one magnetic head, wherein the controller is configured to retract the at least one magnetic head from a flying state above the magnetic disk medium and apply a voltage/current to the at least one element while the magnetic head is retracted.

Figure 1:
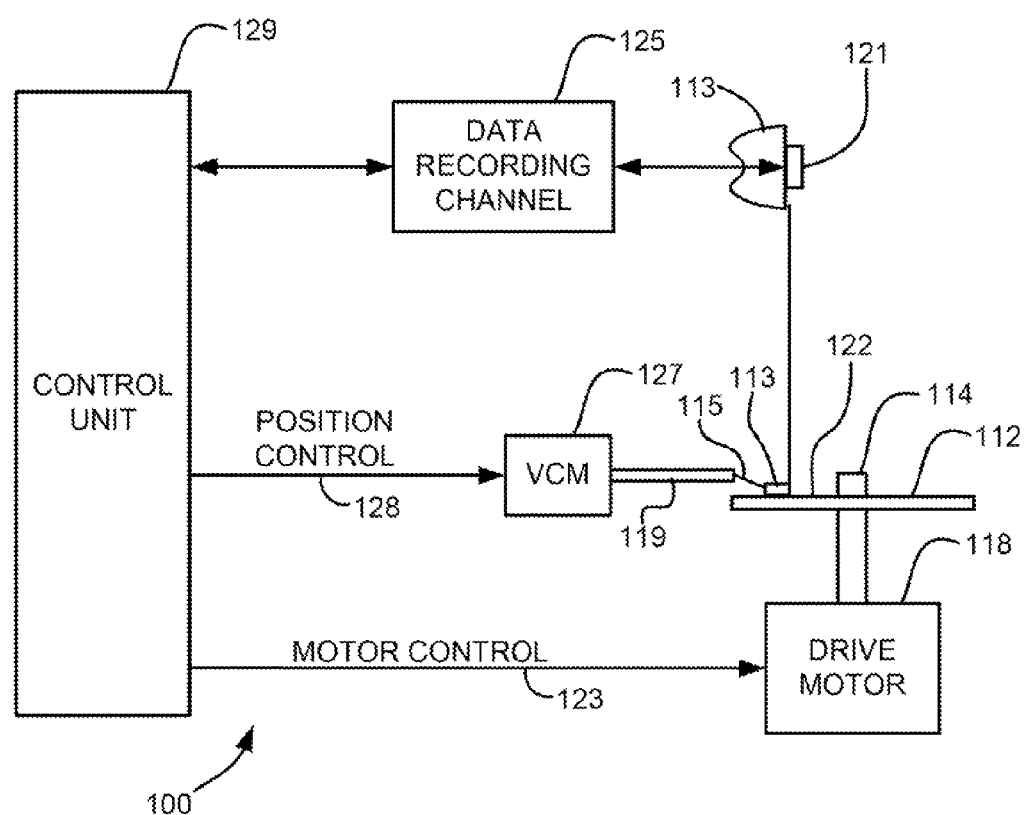
FIG. 1 is a simplified drawing of a magnetic recording disk drive system.

Referring now to FIG. 1, there is shown a disk drive 100 in accordance with one embodiment as disclosed herein. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 that exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion that extends from the ABS to a flare point and a yoke portion that extends from the flare point to the back gap. The flare point is where the second pole piece begins to widen (flare) to form the yoke. The placement of the flare point directly affects the magnitude of the magnetic field produced to write information on the recording medium.

According to one illustrative embodiment, a magnetic data storage system may comprise at least one magnetic head as described herein according to any embodiment, a magnetic medium, a drive mechanism for passing the magnetic medium over the at least one magnetic head, and a controller electrically coupled to the at least one magnetic head for controlling operation of the at least one magnetic head.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

Figure 3B:
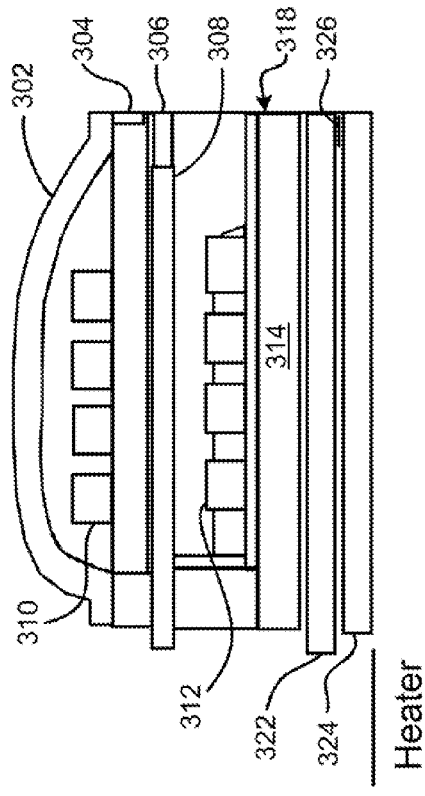
FIG. 3B is a cross-sectional view of one particular embodiment of a piggyback magnetic head with helical coils.
Figure 3A:
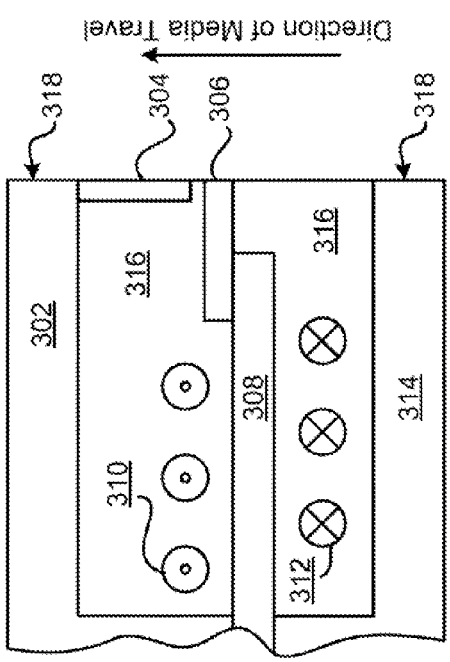
FIG. 3A is a cross-sectional view of one particular embodiment of a perpendicular magnetic head with helical coils.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

Figure 4B:
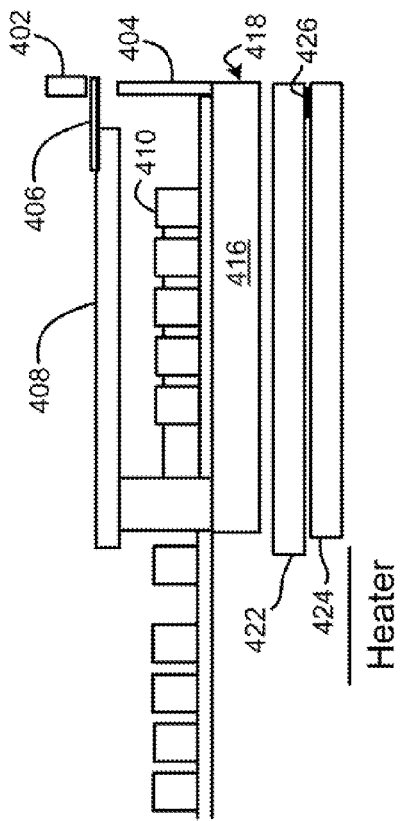
FIG. 4B is a cross-sectional view of one particular embodiment of a piggyback magnetic head with looped coils.
Figure 4A:
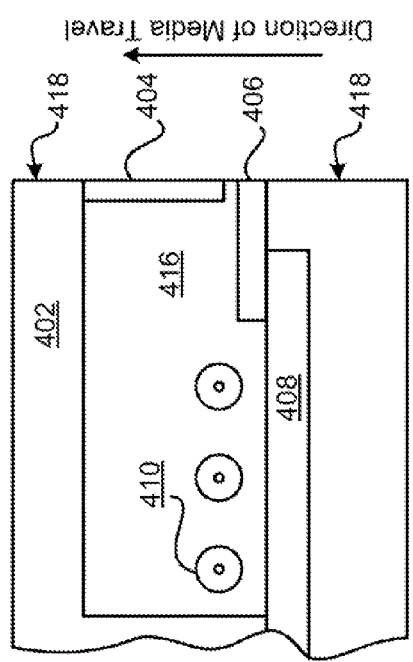
FIG. 4A is a cross-sectional view of one particular embodiment of a perpendicular magnetic head with looped coils.
Figure 6:
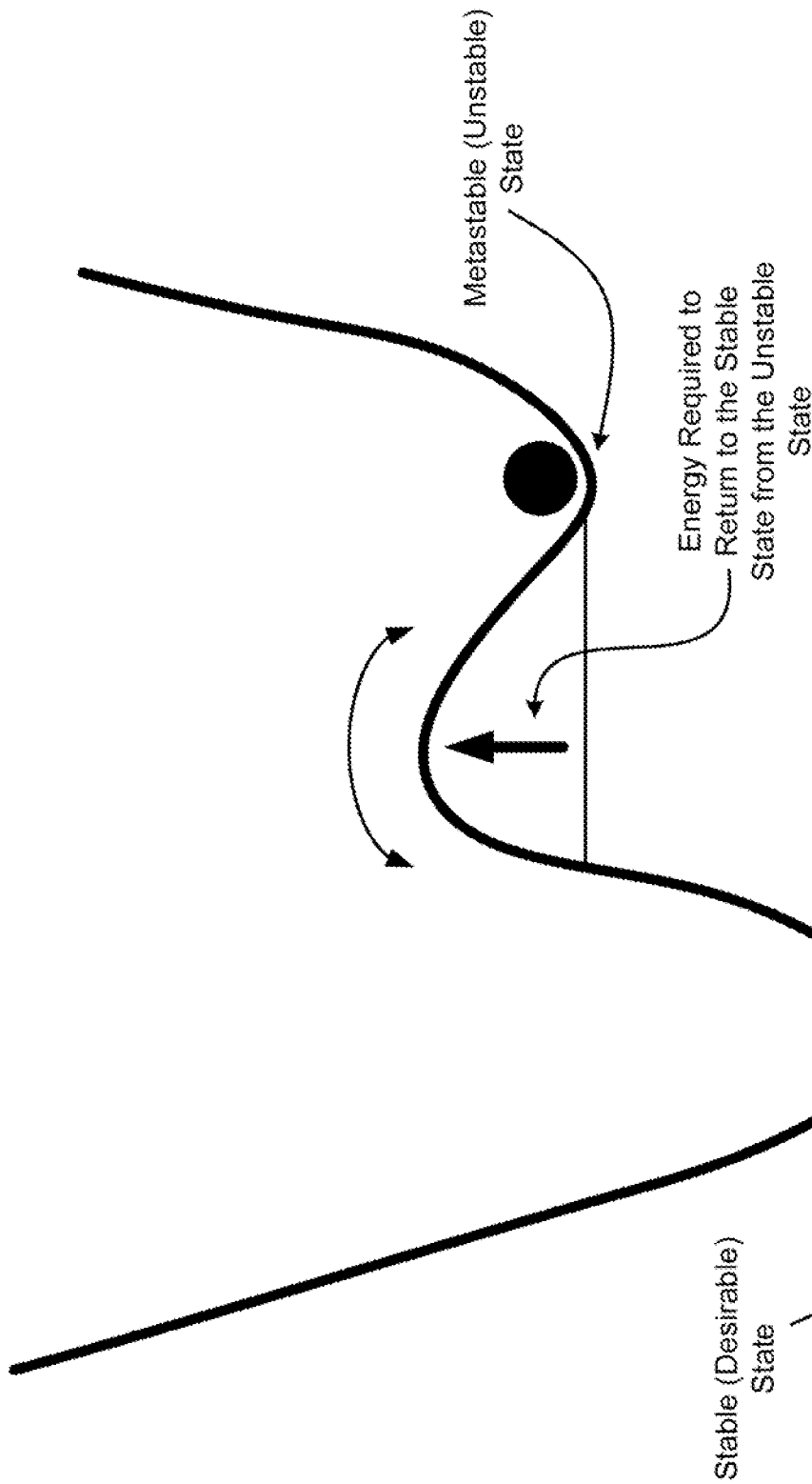
FIG. 6 shows a simplified diagram of energy states of a magnetic head, according to one embodiment.

FIG. 4A is a schematic diagram of one embodiment that uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 that may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater element (Heater) may also be included in the magnetic heads shown in FIGS. 3A and 4A. The position of this heater may vary based on design parameters such as where the protrusion is desired, coefficients of thermal expansion of the surrounding layers, etc.

According to some embodiments, the thermal stress required to return a magnetically unstable magnetic read head to a stable state may be achieved using a method other than applying read-out voltage.

In one such embodiment, as shown in FIG. 5, a magnetic disk device 500 comprises a magnetic head 502 which includes magnetic elements, such as a magnetic read element 504 and/or a magnetic write element 510, and a heating element 506. This magnetic disk device 500 is configured to perform an error recovery method in which, if read-out errors occur due to magnetic instability of the magnetic head 502 (regardless of the cause for the magnetic instability) when data recorded to a magnetic disk 508 is read out, the magnetic head 502, which comprises the magnetic read element 504, is retracted from the magnetic disk 508 (unloaded to a ramp), a current/voltage is applied in this state to the heating element 506 positioned on, near, or within the magnetic head 502 for flying height adjustment (either positioning the magnetic head 502 closer to or farther away from a surface of the magnetic disk 508) until the magnetically unstable magnetic head 502 is returned to a stable state.

When current/voltage or voltage/current is referred to herein, what is meant is that power is generally provided, regardless of the state of the power supplied, the source of the power, or the recipient of the power.

In another embodiment, a magnetic disk device 500 may comprise a magnetic disk medium 508, at least one magnetic head 502, having at least one of: a magnetic read element 504 adapted for reading data from the magnetic disk medium 508 and a magnetic write element 510 adapted for writing data to the magnetic disk medium 508, and a heating element 506 adapted for generating heat upon application of a voltage/current thereto, wherein the heating element 506 is positioned on, near, or within the magnetic head 502, a drive mechanism for passing the magnetic disk medium 508 over the at least one magnetic head 502, and a controller electrically coupled to the at least one magnetic head 502 for controlling operation of the at least one magnetic head 502, wherein the controller is configured to retract the at least one magnetic head 502 from a flying state above the magnetic disk medium 508 and apply the voltage/current to the heating element 506 while the magnetic head 502 is retracted.

In one approach, the heating element 506 may be a TFC element adapted for adjusting a flying height of the magnetic head 502 above the magnetic disk medium 508 upon application of the voltage/current to the TFC element.

In another embodiment, the magnetic head 502 may be unloaded to a ramp for application of the voltage/current to the heating element 506. In one approach, the controller may be configured to apply no more voltage/current to the heating element 506 than is possible without causing irreversible plastic deformation of the magnetic head 502 while the magnetic head 502 is retracted.

In another embodiment, the controller may be configured to detect a magnetically unstable condition of the magnetic head 502, and retracts the magnetic head 502 from the magnetic disk medium 508 and applies the voltage/current to the heating element 506 in response to the detected magnetically unstable condition.

In another embodiment, an element of the magnetic head 502 may have the voltage/current applied thereto in order to heat the element and cause the magnetic head 502 to return to a magnetically stable state. The element may be a write element 510, a read element 504, and/or a heating element 506, according to various embodiments.

Figure 7:
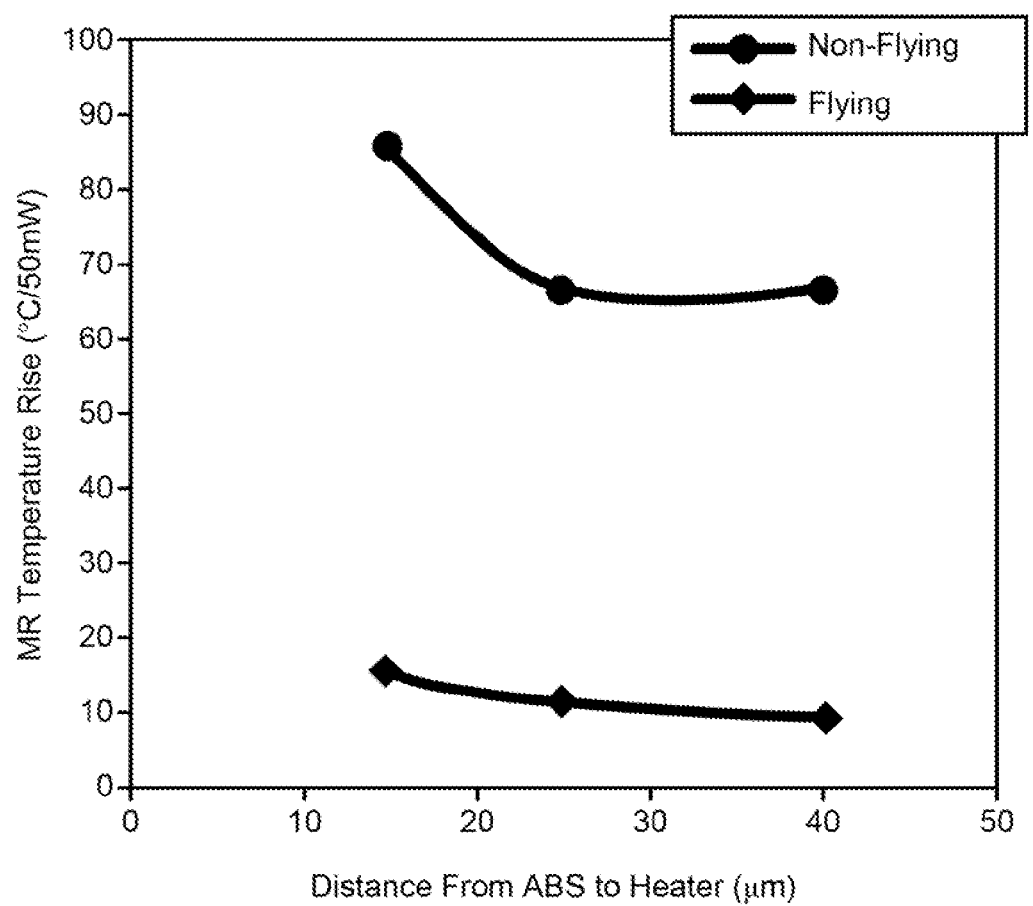
FIG. 7 shows a plot of thermal stress of a magnetic head, according to one embodiment.

If a current/voltage is applied to the heating element 506 to adjust the flying height distance between the magnetic disk 508 and the magnetic head 502, while the magnetic head 502 is flying above the magnetic disk 508 in a position to read and/or write to the magnetic disk 508, temperature increases of components (such as the heating element 506, magnetic read element 504, magnetic write element 510, etc.) of the magnetic head 502 may be kept low due to a cooling effect of air current passing by the elevated magnetic head 502, and consequently there may be insufficient thermal stress to return the magnetically unstable magnetic head 502 to a stable state; however, by retracting the magnetic head 502 from the magnetic disk 508 and applying a current/voltage in this state to the heating element 506 of the magnetic head 502, it is possible to ensure that the thermal stress required to return the magnetically unstable magnetic head 502 to a stable state is applied thereto, as shown in FIG. 7, according to one embodiment.

According to one embodiment, the amount of current/voltage provided to the heating element of the magnetic head when the magnetic head is in the retracted position (unloaded to the ramp) for flying height adjustment purposes is about 50% less than the current/voltage applied to the heating element while the magnetic head is flying above the magnetic disk. This is an advantage over the prior art, since it conserves power while also reducing the impact on the components of the magnetic head, which improves the longevity of the magnetic head.

Figure 8:
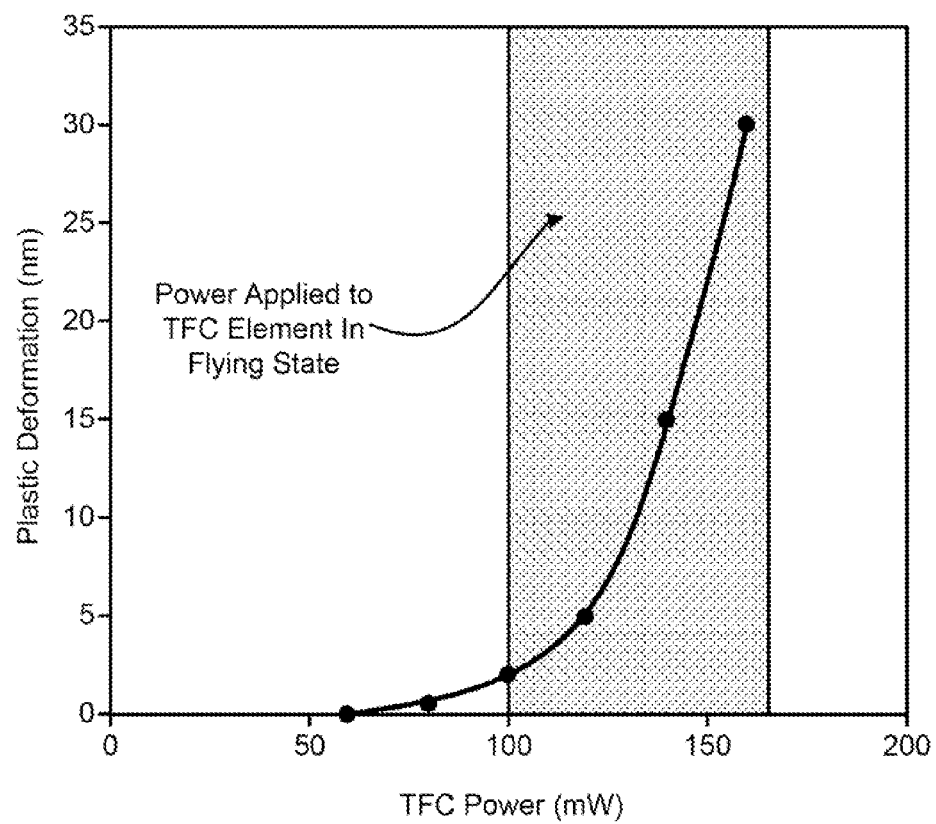
FIG. 8 shows a plot of plastic deformation in relation to heating element power, according to one embodiment.

Referring now to FIG. 8, a description is provided regarding suitable heating element power applied to the heating element in the error recovery process for returning a magnetically unstable magnetic head to a stable state. Generally, heater power (e.g., power provided to the TFC element to adjust the flying height distance) on the order of about 100 mW to about 160 mW is applied to a heating element for flying height adjustment while the magnetic head is flying above the magnetic disk. This is shown as the box as labeled. However, when heater power is provided while the magnetic head is retracted (e.g., offloaded in the ramp), there is a problem in that plastic deformation occurs in the writing element and read element sections due to excessive heat, and the original shapes thereof are not restored even when the heater power is cut off, thereby affecting flying performance negatively. Since this plastic deformation occurs when the heater power reaches about 75 mW, in order to magnetically stabilize the magnetic head, according to one embodiment, it is useful to restrict the current/voltage provided to the heater element to 50% or less when compared to the current/voltage applied when the magnetic head is flying above the magnetic disk. For example, the voltage/current applied to the heating element may be less than about 100 mW while the magnetic head is retracted from the magnetic disk medium, in one embodiment. In a more preferred embodiment, the voltage/current applied to the heating element may be less than about 75 mW while the magnetic head is retracted from the magnetic disk medium.

According to another embodiment, a magnetic disk device (such as a HDD) may comprise a magnetic head which is retracted from a magnetic disk while a current/voltage is applied in this state to a heating element positioned on, near, or inside the magnetic head for flying height adjustment purposes. In another embodiment, a current/voltage may be applied in this state to any or all of a write element, a read element, and/or a heating element positioned within the magnetic head for flying height adjustment purposes.

Figure 9:
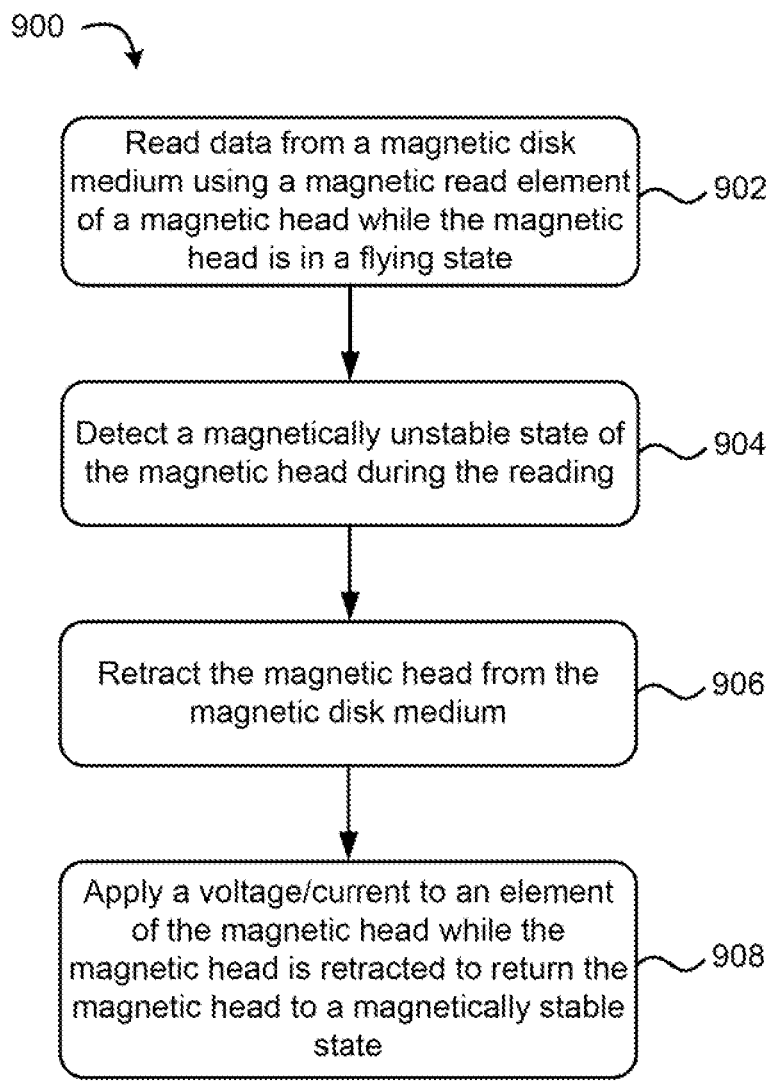
FIG. 9 shows a flowchart of a method, according to one embodiment.

Now referring to FIG. 9, a method 900 for adjusting a flying height distance is shown according to one embodiment. The method 900 may be carried out in any desired environment, including those shown and described in FIGS. 1-8, among others. Furthermore, more or less operations than those described regarding FIG. 9 may be included in the method 900, according to various embodiments.

In operation 902, data is read from a magnetic disk medium using a magnetic read element of a magnetic head while the magnetic head is in a flying state.

The flying state may be described as a state where the magnetic head is positioned above the magnetic disk medium in order to read and/or write data from/to the magnetic disk medium. The flying state, in one embodiment, is a state when the magnetic head is positioned at the flying-height distance above the magnetic disk medium.

In operation 904, a magnetically unstable state of the magnetic head is detected during the reading. Any method, device, apparatus, etc., may be used to detect the magnetically unstable state as would be understood by one of skill in the art upon reading the present descriptions.

In operation 906, the magnetic head is retracted from the magnetic disk medium. Any device, method, apparatus, etc., may be used to retract the magnetic head from the magnetic disk medium, such as by using an actuator arm of a magnetic disk device, such as a HDD.

In operation 908, a voltage/current is applied to an element of the magnetic head while the magnetic head is retracted to return the magnetic head to a magnetically stable state.

In one embodiment, the magnetic head may be unloaded to a ramp for applying the voltage/current to the element. In an alternate embodiment, the magnetic head may be altered from the flying state and moved away from the magnetic disk medium and away from any air current which may reduce the effectiveness of applying the voltage/current to the element.

In another embodiment, the method 900 may include returning the magnetic head to the flying state after applying the voltage/current to continue reading data from the magnetic disk medium. In this way, after the magnetic head is returned to the magnetically stable state, the magnetic head may once again be used to read and/or write data from/to the magnetic disk medium.

In various embodiments, the element of the magnetic head may be a read element, a write element, and/or a heating element. In a further embodiment, the heating element may be a TFC element adapted for adjusting a flying height of the magnetic head above the magnetic disk medium upon application of the voltage/current to the TFC element, as would be understood by one of skill in the art.

In preferred embodiments, no more voltage/current is applied to the heating element than is possible without causing irreversible plastic deformation of the magnetic head while the magnetic head is retracted, as shown in FIG. 8, according to one embodiment. In some embodiments, that voltage/current may be less than about 100 mW, more preferably less than about 75 mW.

Figure 10:
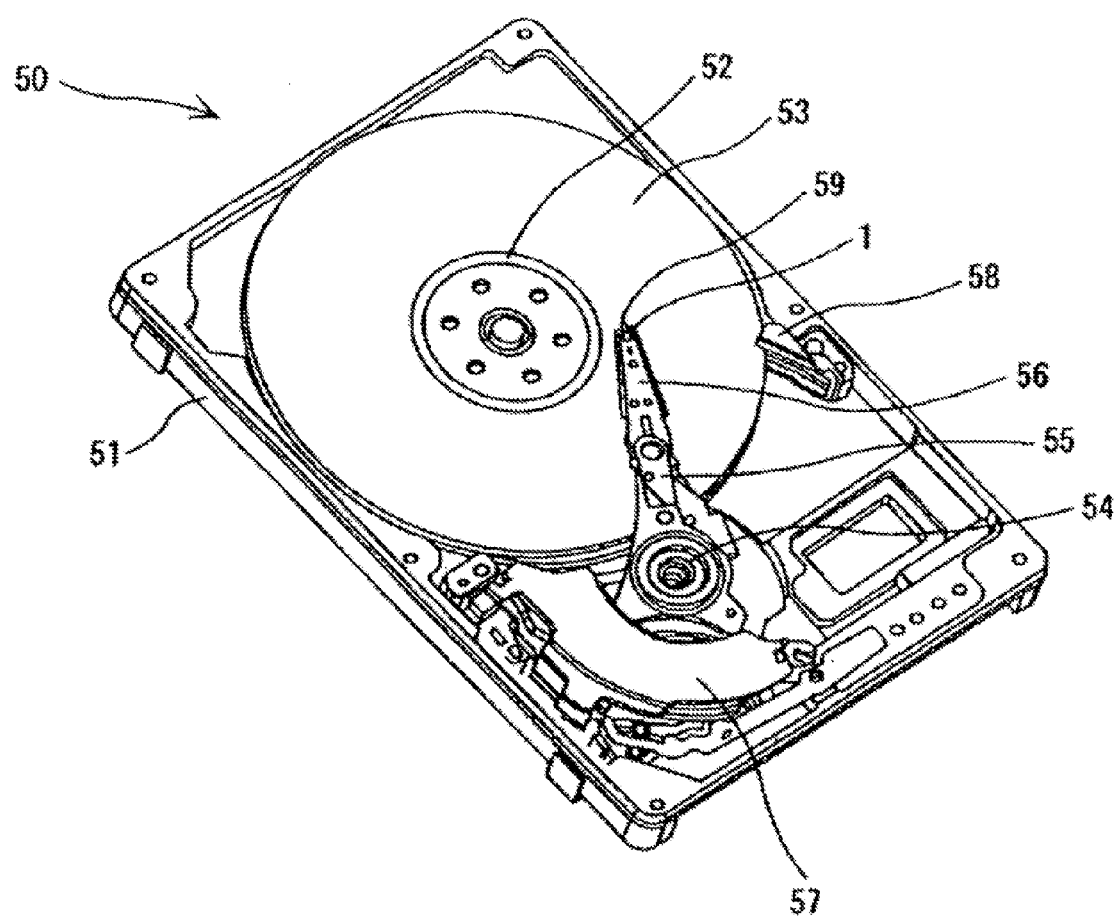
FIG. 10 shows a schematic view of a magnetic disk device, according to one embodiment.

According to one embodiment, as shown in FIG. 10, a magnetic disk drive 50 may comprise a magnetic head 1 (which may be referred to as a magnetic head slider) and a magnetic disk 53. The magnetic disk 53 is driven to rotate about the rotation axis of a spindle motor fixed to a base 51 through coupling with a spindle 52. An actuator arm 55 is pivotally supported by a pivot 54. A suspension 56 is attached to one end of the actuator arm 55 while a coil (not shown in FIG. 10) comprising a voice coil motor (VCM) 57 is attached to the other end. To the front end of the suspension 56, a magnetic head slider 1 is attached. On the periphery of the magnetic disk 53, the base 51 is provided with a ramp structure 58, which may be used as described herein according to various embodiments. The ramp structure 58 has a slope formed thereon so that the lift tab 59 runs up the slope when the magnetic head slider 1 is unloaded.

Energizing the coil of the VCM 57 generates rotation torque forcing the actuator arm 55 to move the suspension 56 attached thereon in the radial direction of the magnetic disk 53. By this rotary action, the magnetic head slider 1 attached to the front end of the suspension 56 is positioned to a certain track for reading/writing data. During unload, the magnetic head slider 1 is moved so that the lift tab 59 runs up the slope of the ramp structure 58. During load, the magnetic head slider 1, standing by on the ramp structure 58, is loaded to the flying state above the recording surface of the magnetic disk 53.

The magnetic slider 1 is designed to fly as an air-lubricated bearing by using the wedge film effect of air so as not to cause direct solid contact with the magnetic disk 53. The flying height distance of the magnetic head slider 1 is about 10 nm or less. Of course, other flying height distances are possible as would be known to one of skill in the art. Note that although the magnetic disk drive 50 described herein has a load/unload mechanism, the drive may be designed so that when the drive is stopped, the magnetic head slider 1 may employ the contact start and stop system. In this case, the magnetic head slider 1 stands by in a certain area of the magnetic disk 53 when the drive is not operated. In addition, the magnetic recording style may be either current-in-plane (CIP) recording or current-perpendicular-to-plane (CPP) recording.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic disk device, comprising:
a magnetic disk medium;
at least one magnetic head, comprising:
   at least one of: a magnetic read element and a magnetic write element; and
   a heating element configured to generate heat upon application of a voltage/current thereto, wherein the heating element is positioned on, near, or within the magnetic head;
a drive mechanism for passing the magnetic disk medium over the at least one magnetic head; and
a controller electrically coupled to the at least one magnetic head for controlling operation of the at least one magnetic head, wherein the controller is configured to:
   detect a state of the magnetic head based on increased read-out errors, and
   retract the at least one magnetic head from a flying state above the magnetic disk medium and apply the voltage/current to the heating element while the magnetic head is retracted without causing irreversible plastic deformation of the magnetic head in response to the detected state in order to decrease read-out errors.

2. The magnetic head as recited in claim 1, wherein the heating element is a thermal fly-height control (TFC) element configured to adjust a flying height of the magnetic head above a magnetic disk medium upon application of the voltage/current to the TFC element.

3. The magnetic head as recited in claim 1, wherein the magnetic head is unloaded to a ramp for application of the voltage/current to the heating element.

4. The magnetic head as recited in claim 1, wherein the controller is configured to return the magnetic head to the flying state after applying the voltage/current to continue reading data from the magnetic disk medium.

5. The magnetic head as recited in claim 4, wherein an amount of voltage/current applied is less than about 100 mW.

6. The magnetic head as recited in claim 4, wherein an amount of voltage/current applied is less than about 75 mW.

7. The magnetic head as recited in claim 1, wherein an amount of voltage/current applied is less than about 75 mW.

8. A method, comprising:
reading data from a magnetic disk medium using a magnetic read element of a magnetic head while the magnetic head is in a flying state;
detecting an unstable state of the magnetic head during the reading based on increased read-out errors;
retracting the magnetic head from the magnetic disk medium; and
applying a voltage/current to an element of the magnetic head while the magnetic head is retracted to return the magnetic head to a stable state without causing irreversible plastic deformation of the magnetic head.

9. The method as recited in claim 8, further comprising returning the magnetic head to the flying state after applying the voltage/current to continue reading data from the magnetic disk medium.

10. The method as recited in claim 8, wherein the element having the voltage/current applied thereto is a heating element of the magnetic head.

11. The method as recited in claim 10, wherein the heating element is a thermal fly-height control (TFC) element configured to adjust a flying height of the magnetic head above the magnetic disk medium upon application of the voltage/current to the TFC element.

12. The method as recited in claim 8, wherein the element having the voltage/current applied thereto is a magnetic element of the magnetic head chosen from a group consisting of a write element and a read element.

13. The method as recited in claim 8, wherein the magnetic head is unloaded to a ramp for applying the voltage/current to the element.

14. The method as recited in claim 9, wherein after the magnetic head is returned to the flying state, it is determined that the magnetic head is in the stable state based on a reduction in read-out errors.

15. The method as recited in claim 8, wherein less than about 100 mW of voltage/current is applied to return the magnetic head to a magnetically stable state.

16. The method as recited in claim 8, wherein less than about 75 mW of voltage/current is applied to return the magnetic head to a magnetically stable state.

17. A magnetic disk device, comprising:
a magnetic disk medium;

at least one magnetic head, comprising at least one element therein;

a drive mechanism for passing the magnetic disk medium over the at least one magnetic head; and a controller electrically coupled to the at least one magnetic head for controlling operation of the at least one magnetic head, wherein the controller is configured to:

detect a state of the magnetic head based on increased read-out errors, and retract the at least one magnetic head from a flying state above the magnetic disk medium and apply the voltage/current to the heating element while the magnetic head is retracted without causing irreversible plastic deformation of the magnetic head in response to the detected state in order to decrease read-out errors.

18. The magnetic head as recited in claim 17, wherein the at least one element is selected from a group consisting of: a heating element configured to adjust a flying height of the magnetic head above the magnetic disk medium, a write element, and a read element.

19. The magnetic head as recited in claim 17, wherein the magnetic head is unloaded to a ramp for application of the voltage/current to the element.

20. The magnetic head as recited in claim 17, wherein an amount of voltage/current applied is less than about 75 mW.

* * * * *